United States Patent [19]
Bensinger et al.

[11] Patent Number: 5,315,788
[45] Date of Patent: May 31, 1994

[54] LOW FRICTION TAPE FOR MOVABLE VEHICLE GLASS

[75] Inventors: Kenneth Bensinger, Mt. Clemens; Edward Rycamber, Milford, Mich.

[73] Assignee: General Motors Corporation, Detroit, Mich.

[21] Appl. No.: 77,141

[22] Filed: Jun. 16, 1993

[51] Int. Cl.⁵ .......................... E05D 15/06; E06B 3/00
[52] U.S. Cl. ......................................... 49/404; 49/413; 49/330; 49/440; 49/501; 49/503
[58] Field of Search ..................... 49/462, 475.1, 490.1, 49/403, 440, 374–377, 501, 503, 404

[56] References Cited

U.S. PATENT DOCUMENTS 3,581,884  6/1971  Caldwell et al. ................ 49/475.11
4,823,511  4/1989  Herliczek et al. .................... 49/404

*Primary Examiner*—Philip C. Kannan
*Attorney, Agent, or Firm*—Todd L. Moore

[57] ABSTRACT

A low friction tape adhesively connected to a movable vehicle door glass for isolating the door glass from a rubber glass run channel and providing a low friction surface for slidably engaging the glass run channel to prohibit glass chatter and noise created by the sliding engagement of the door glass within the glass run channel. The glass run channel is housed within a stationary frame portion of the vehicle door and is utilized to support and guide the door glass as well as seal the door glass to the vehicle door. Separate segments of the low friction tape are applied to the vertical edges and the periphery of the sides of the door glass to prohibit direct contact of the door glass and the glass run channel. Due to the curvature of the door glass, the low friction tape must be applied in several separate segments so that wrinkling of the low friction tape is avoided when applying the tape segments to the door glass. The opposite ends of each tape segment are tapered inward from the vertical edges of the door glass towards each other on both the front side and the back side of the door glass so that the ends of the tape segments do not peel back upon the door glass slidably engaging the glass run channel.

5 Claims, 1 Drawing Sheet

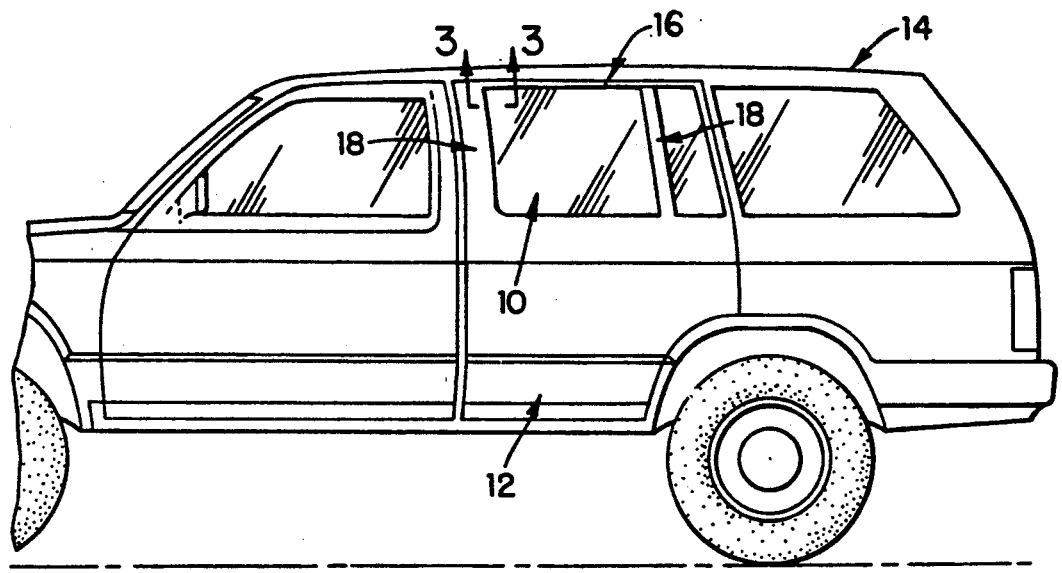
Fig. 1
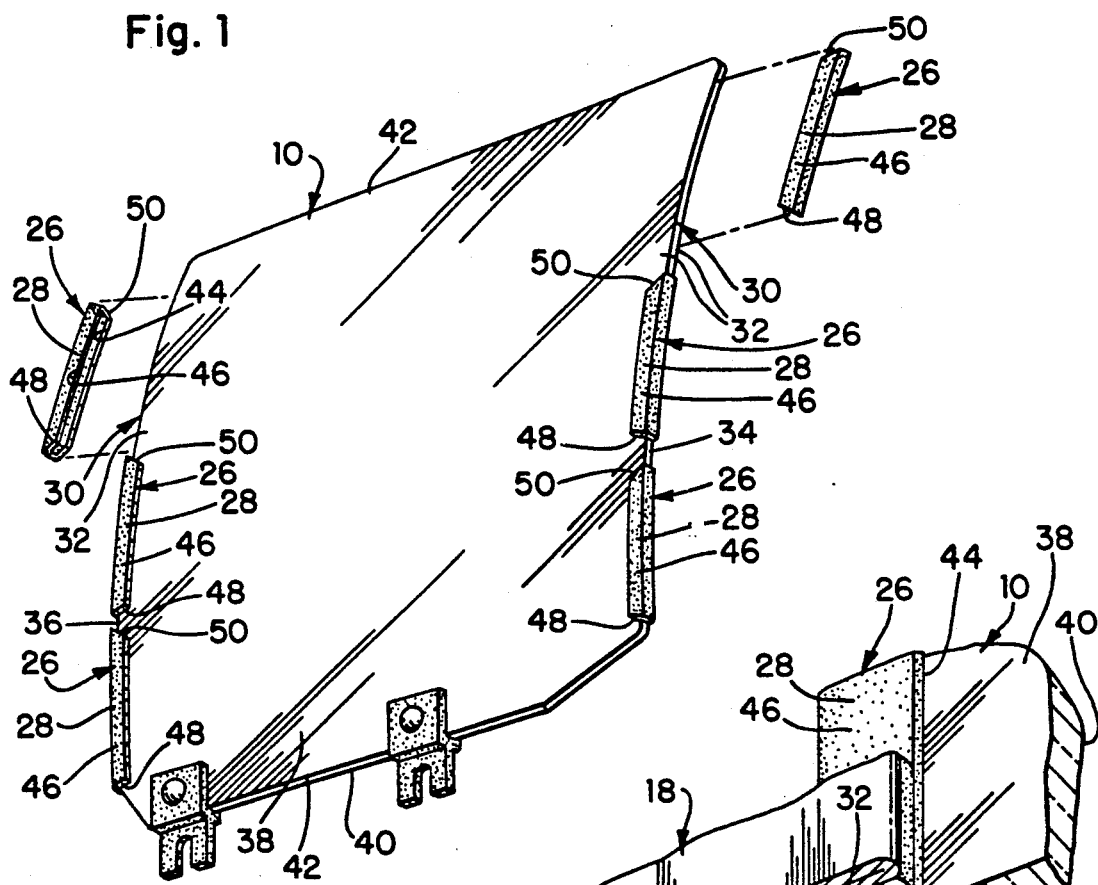
Fig. 2
Fig. 3

LOW FRICTION TAPE FOR MOVABLE VEHICLE GLASS

The present invention relates to movable vehicle glass assemblies and more particularly to a low friction tape that prohibits glass chatter noise created by the sliding engagement of a movable vehicle door glass with a rubber glass run channel within the glass frame portion of a vehicle door.

BACKGROUND OF THE INVENTION

Generally, vehicle doors typically have a frame portion by which to guide and support a movable vehicle door glass. The frame portion provides a housing having a substantially U-shaped cross section that houses a similarly shaped rubber glass run channel. The glass run channel provides a channel for slidably engaging the movable vehicle door glass and guiding the door glass as it is moved between a raised position and a lowered position. The glass run channel further provides a proper seal against the door glass.

It has been observed that an audible chatter may occur upon the movable vehicle door glass being moved between the raised position and the lowered position, especially when moisture is present. Various factors are thought to combine and enhance the creation of the audible chatter. One such factor is the variance in friction between the rubber glass run channel and the surface of the door glass as the door glass moves within the glass run channel. The friction variation may be caused by waves and flat spots in the surface of the door glass which create a suction against the rubber glass run channel, especially when moisture exists between the door glass and the glass run channel. The glass chatter is enhanced with an increase in the door glass to rubber glass run channel contact ratio.

Other variables may also enhance the glass chatter and noise created by the movable vehicle door glass slidably engaging the rubber glass run channel, such as an electrically powered door glass that provides constant speed by which the door glass is moved between the raised position and the lowered position. Also, the use of certain door glass regulator mechanisms, such as single arm regulators, provide less stability than other door glass regulator systems, such as cross arm regulators, and therefore are more prone to glass chatter and noise due to the increased freedom of the door glass to move.

SUMMARY OF THE INVENTION

The present invention eliminates the above discussed glass chatter created by a movable vehicle door glass slidably engaging a rubber glass run channel upon the door glass moving between a raised position and a lowered position in order to create a more pleasing environment for the operator and passengers of the vehicle. Applicants have eliminated the glass chatter by providing a low friction tape adhesively attached to the door glass. The low friction tape isolates the door glass from the glass run channel while also providing a consistent low friction surface for slidably engaging the glass run channel. The low friction tape allows the door glass to freely slide along the glass run channel upon the door glass moving between an upward position and a downward position without generating undesirable audible noise, irregardless of the glass regulator system utilized or the presence of moisture. The low friction tape is placed along the vertical edges of the door glass where the door glass slidably engages the glass run channel. The low friction tape is placed only between the glass run channel and the door glass so that the low friction tape is out of the passenger's viewpoint, thus allowing the door glass to remain aesthetically pleasing.

In the preferred form, the low friction tape is fabricated from an ultra high molecular weight polyethylene material having an adhesive backing. The ultra high molecular weight structure provides a high density polyethylene material which provides a durable tape with a low friction surface. For curved windows, multiple segments of the low friction tape are preferably applied on each vertical edge of the movable vehicle door glass so that the low friction tape does not wrinkle when applied to the door glass. Typically, the multiple segments of low friction tape are equally spaced along the vertical edges of the door glass.

In one form of the invention, the low friction tape wraps around the vertical edges of the movable vehicle door glass to form a U-shaped cross section. Opposite ends of each tape segment are tapered inwardly from the vertical edge of the door glass at an angle, such as 45°, so that the low friction tape does not peel at its ends as a result of slidably engaging the rubber glass run channel.

To this end, the objects of the present invention are to provide a new and improved low friction tape adhesively connected to a movable vehicle door glass that isolates the door glass from a rubber glass run channel and provides a low friction surface for engaging the glass run channel so that the creation of glass chatter and noise from the sliding engagement of the door glass with the glass run channel is prohibited.

BRIEF DESCRIPTION OF THE DRAWINGS

FIG. 1 is a side elevation view showing a movable vehicle door glass that is guided and supported on both of its vertical edges by a frame portion of a rear vehicle door.

FIG. 2 is a perspective view with some parts exploded showing low friction tape segments applied to the movable vehicle door glass of FIG. 1.

FIG. 3 is a section view in the direction of arrows 3—3 in FIG. 1 showing the low friction tape isolating the movable vehicle door glass from the rubber glass run channel and providing a low friction surface for slidably engaging the glass run channel.

DESCRIPTION OF THE PREFERRED EMBODIMENTS

Referring to the drawings, the present invention will now be described with reference to the preferred embodiments.

FIG. 1 shows a typical application for the present invention wherein a movable vehicle door glass 10 is located in a rear passenger door 12 of a motor vehicle 14. The rear passenger door 12 provides a frame portion 16 that supports and guides the door glass 10. The frame portion 16 of the rear passenger door 12 has a pair of vertical columns 18 having substantially U-shaped cross sections that provide a housing 20 in each column 18, as seen in FIG. 3. The housings 20 of the columns 18 house a rubber glass run channel 22 which also has a U-shaped cross section. The U-shaped cross section of the glass run channel 22 provides a channel 24 that is smaller in width than the width of the door glass 10. The rubber glass run channel 22 is flexible so that the wider door glass 10 is received by the channel 24 of the glass run channel 22. The rubber glass run channel 22 provides a seal between the door glass 10 and the frame portion 16 of the vehicle door 12 so that the interior passenger compartment (not shown) is sealed off from outside elements.

In order to eliminate any glass chatter or noise that may be created by the movable vehicle door glass 10 moving within the rubber glass run channel 22, the present invention provides for securing a low friction tape 26 to the areas of the door glass 10 that slidably engage the glass run channel 22. The low friction tape 26 isolates the door glass 10 from the glass run channel 22 and provides a low friction surface 28 on the door glass 10 for slidably engaging the glass run channel 22. This is illustrated in FIGS. 2 and 3 where the low friction tape 26 is applied to the door glass 10 in separate, similar segments. The low friction tape 26 is adhesively connected to each of a pair of vertical edges 30 of the door glass 10 while also extending to peripheries 32 on opposite sides 34, 36 of a front side 38 and a back side 40 of the door glass 10. The peripheries 32 are adjacent to the vertical edges 30 of the door glass 10 and are comprised of the areas where the door glass 10 would be in contact with the glass run channel 22 on the front side 38 and the back side 40 of the door glass 10.

As seen in FIG. 3, each low friction tape segment 26 has a substantially U-shaped cross section and is only applied to the areas where the door glass 10 would be in direct contact with the glass run channel 22. The U-shaped cross section is formed by having the low friction tape 26 continually wrap from the periphery 32 of the front side 38 of the door glass 10, around the vertical edge 30 of the door glass 10 and to the periphery 32 of the back side 40 of the door glass 10. Due to the curvature in the door glass 10, the low friction tape 26 is divided into six separate segments so that the low friction tape 26 does not wrinkle when applied to the door glass 10. The present invention is not limited to six segments of low friction tape 26, but rather, any number of low friction tape segments 26 may be utilized depending on the curvature and the height of the door glass 10.

To avoid peeling of the low friction tape segments 26, the tape segments 26 should not overlap one another. In one embodiment, a 5 mm space is maintained between the ends of the low friction tape segments 26 so that a space is guaranteed while also assuring the tape segments 26 only cover the vertical edges 30, and not a horizontal edge 42, of the movable vehicle door glass 10. Preferably, the low friction tape segments 26 should be as close to one another along the vertical edge 30 as possible without contacting one another. This eliminates as much door glass 10 to rubber glass run channel 22 contact as possible, thereby eliminating the opportunity for the creation of glass chatter and noise caused by the sliding engagement of the door glass 10 in the glass run channel 22.

In order to provide a low friction tape 26 with the durability to withstand continued slidable engagement of the movable vehicle door glass 10 with the rubber glass run channel 22, the low friction tape 26 is fabricated from an ultra high molecular weight polyethylene material, such as a 3M UHMW type #54301 tape or a Walco #8026352302-5 tape. The ultra high molecular weight structure provides a high density polyethylene material with excellent durability characteristics as well as a low friction surface 28. The low friction tape 26 has a conventional water impervious adhesive applied to a back side 44 of the low friction tape 26 which is in contact with the door glass 10. A front side 46 of the low friction tape 26 provides a low friction surface 28 to allow for the easy sliding of the low friction tape 26 within the glass run channel 22. In one embodiment, the low friction surface 28 has a coefficient of static friction of 0.019. The present invention is not limited to such a coefficient of static friction value, but rather, the coefficient may be any value that allows the door glass 10 to slide freely within the glass run channel 22 without creating glass chatter and noise.

To prevent the ends 48, 50 of the low friction tape segments 26 from peeling due to the sliding engagement with the rubber glass run channel 22, each end 48, 50 of the low friction tape segments 26, on both the front side 38 and the back side 40 of the door glass 10, is tapered at an angle, preferably 45°, inward from the vertical edges 30 of the door glass 10 toward each of their opposed ends 48, 50, as seen in FIG. 2. The portion of the low friction tape 26 that wraps around the vertical edges 30 of the door glass 10 is substantially square to the front side 38 and the back side 40 of the door glass 10. The present invention is not limited to a 45° taper on the opposed ends 48, 50 of the low friction tape segments 26 as other angles may be used, or the taper may be in the form of a radiused curve.

It should be noted that the present invention is not limited to a rear movable vehicle door glass 10, but rather, may be utilized on any movable vehicle glass. Also, the present invention is not limited to being utilized on both vertical edges 30 of the door glass 10 but may be utilized on only one vertical edge of the door glass 10. Thus, it is seen that the present invention provides a new and improved low friction tape 26 that isolates a movable vehicle door glass 10 from a rubber glass run channel 22 and provides a low friction surface 28 for engaging the glass run channel 22 to prohibit glass chatter and noise created from the sliding engagement of the door glass 10 within the glass run channel 22.

The embodiments of the invention in which an exclusive property or privilege is claimed are defined as follows:

1. In a vehicle door having a stationary frame portion for supporting and guiding a movable vehicle door glass with said frame portion having a housing, a glass run channel being housed in said housing, and said movable vehicle door glass slidably engaging said glass run channel within said frame portion, an improvement comprising:

a low friction tape being adhesively connected to portions of said movable vehicle door glass to isolate said movable vehicle door glass from said glass run channel and provide a low friction surface for engaging said glass run channel to prohibit the generation of glass chatter and noise created by the sliding engagement of said movable vehicle door glass within said glass run channel.

2. The improvement stated in claim 1, wherein said low friction tape comprises an ultra high molecular weight polyethylene material.

3. In a vehicle door having a stationary frame portion for supporting and guiding a movable vehicle door glass with said frame portion having a housing, a glass run channel being housed in said housing, and said movable vehicle door glass having an engagement portion for slidably engaging said glass run channel within said frame portion, the improvement comprising:

a plurality of low friction tape segments having opposite ends and being adhesively attached to said engagement portion of said movable vehicle door glass so that said movable vehicle door glass is isolated from said glass run channel and a low friction surface is provided for engaging said glass run channel; and said opposite ends of said low friction tape segments being tapered inward toward each other to prohibit the peeling of said low friction tape segments upon said movable vehicle door glass slidably engaging said glass run channel.

4. The improvement as stated in claim 3, wherein said low friction tape comprises an ultra high molecular weight polyethylene material.

5. In a vehicle door having a stationary frame portion for supporting and guiding a movable vehicle door glass having opposite sides, a front side, a back side, a pair of vertical edges and a periphery on said opposite sides of said front side and said back side, said frame portion having a housing, a rubber glass run channel being housed in said housing, and said movable vehicle door glass slidably engaging said rubber glass run channel within said frame portion, the improvement comprising:

six similar ultra high molecular weight polyethylene tape segments having a substantially U-shaped cross section with three of said tape segments being adhesively connected to said periphery on one of said opposite sides and one of said pair of vertical edges of said movable vehicle door glass, and the other three tape segments being adhesively connected to said periphery on the other of said opposite sides and the other of said pair of vertical edges of said movable vehicle door glass to isolate said movable vehicle door glass from said rubber glass run channel and to provide a low friction surface for the sliding engagement of said movable vehicle door glass with said rubber glass run channel; and said six tape segments each having first opposite ends on said front side of said movable vehicle door glass and second opposite ends on said back side of said movable vehicle door glass, and said first opposite ends tapering at a 45° angle inward from said vertical edge of said movable vehicle door glass toward each of said first opposite ends, and said second opposite ends tapering at a 45° angle inward from said vertical edges of said movable vehicle door glass toward each of said second opposite ends to prohibit peeling of said first and second opposite ends of said low friction tape segments upon said movable vehicle door glass slidably engaging said rubber glass run channel.

* * * * *